(12) United States Patent
Printezis et al.

(10) Patent No.: US 8,589,456 B2
(45) Date of Patent: Nov. 19, 2013

(54) PROMPT LARGE OBJECT RECLAMATION

(75) Inventors: Antonios Printezis, Burlington, MA (US); Y. Srinivas Ramakrishna, Union City, CA (US)

(73) Assignee: Oracle America, Inc., Redwood City, CA (US)

( * ) Notice: Subject to any disclaimer, the term of this patent is extended or adjusted under 35 U.S.C. 154(b) by 669 days.

(21) Appl. No.: 12/708,996

(22) Filed: Feb. 19, 2010

(65) Prior Publication Data

US 2011/0208792 A1 Aug. 25, 2011

(51) Int. Cl.
  *G06F 12/00* (2006.01)
(52) U.S. Cl.
  USPC ............... 707/819; 707/814; 711/165
(58) Field of Classification Search
  USPC .................. 707/819, 814; 711/165
  See application file for complete search history.

(56) References Cited

U.S. PATENT DOCUMENTS

| | | | | |
|---|---|---|---|---|
| 7,340,494 B1 * | 3/2008 | Detlefs et al. | ............ | 1/1 |
| 7,428,560 B1 * | 9/2008 | Detlefs et al. | ............ | 1/1 |
| 7,461,220 B2 * | 12/2008 | Blandy | ............ | 711/159 |
| 7,792,879 B2 * | 9/2010 | Qi et al. | ............ | 707/813 |
| 7,797,498 B2 * | 9/2010 | Jung et al. | ............ | 711/154 |
| 7,937,419 B2 * | 5/2011 | Ylonen | ............ | 707/813 |
| 2011/0119318 A1 * | 5/2011 | Daynes et al. | ............ | 707/816 |

OTHER PUBLICATIONS

Hudson et al., "Incremental Collection of Mature Objects," Proceedings of the International Workshop on Memory Management, pp. 388-403, Sep. 1992.
Ungar, David, "Generation Scavenging: A Non-disruptive High Performance Storage Reclamation Algorithm," ACM, pp. 157-167, 1984.

* cited by examiner

*Primary Examiner* — Pierre Vital
*Assistant Examiner* — Christopher J Raab
(74) *Attorney, Agent, or Firm* — Polsinelli PC

(57) ABSTRACT

The present disclosure describes garbage collection that provides prompt reclamation of large objects. A heap space is divided into Young regions, Old regions, and Humongous regions. A remembered set is created and maintained, during the execution of one or more programs, for each region that specifies where there are references from outside the region to inside the region. A garbage collection list is generated specifying regions to perform garbage collection on. All Young regions and at least one Humongous region are included in the garbage collection list. If it is determined to include Old regions, the Old regions are selected and included in the garbage collection list. Then, a garbage collection is performed on the regions specified in the garbage collection list. During the garbage collection, the indication for each region is utilized to determine reachable objects in the region, ensuring that reachable objects are not deallocated.

18 Claims, 11 Drawing Sheets

PROMPT LARGE OBJECT RECLAMATION

FIELD OF THE INVENTION

This invention relates generally to memory management, and more specifically to the process of garbage collecting large objects.

BACKGROUND

Memory is generally allocated for a program during execution from a pool of unused memory area called a heap. Garbage collection is a form of memory management for programs. During execution, the garbage collector attempts to identify memory allocated to objects that are not in use by the program, so that they may be deallocated, or reclaimed. An object may be in use by the program, or reachable, if the object can be accessed or reached by the program's current state. Since the precise allocation of space in the heap to objects is not known in advance, the memory allocated to objects cannot be accessed via the actual address of the memory. Rather, the memory may be accessed indirectly by the program utilizing references. An object is reachable if it is referenced by a local variable or parameter in a currently invoked function or a global variable, or is referenced by a reachable object. The garbage collector deallocates memory allocated to objects that are no longer reachable. It must not deallocate memory occupied by objects that are still reachable.

One kind of garbage collector, referred to herein as a Garbage-first garbage collector, is a generational, region-based garbage collector whose strategy is to minimize garbage collection copying time by identifying regions with the most garbage for collection. A generational garbage collector divides objects into generations and collects younger generations more frequently than older generations. An example of a generational garbage collector is described in the article "Generation Scavenging: A Non-Disruptive High Performance Storage Reclamation Algorithm," David Ungar, *SIGPLAN Notices*, 19(5):157-167, May 1984. A region-based garbage collector divides the heap into regions and collects sets of regions during garbage collection. An example of a region-based garbage collector is described in the article "Incremental Collection of Mature Objects," Richard L Hudson and J. Eliot B. Moss, In Yves Bekkers and Jacques Cohen, editors, *International Workshop on Memory Management*, Lecture Notes in Computer Science, pages 388-403, St. Malo, France, September 1992. The Garbage-first garbage collector performs frequent garbage collections where the garbage collector deallocates memory allocated to objects that are no longer reachable and less frequent marking cycles where the garbage collector marks reachable objects.

The Garbage-first garbage collector divides the heap space into "Young" regions, "Old" regions and "Humongous" regions. Objects stored in the various regions are referred to as Young, Old, or Humongous depending on the corresponding region in which they are stored. When objects are first allocated memory, they are generally designated as Young objects and stored in a Young region. Eventually Young objects are "promoted" to storage in Old regions if they are not deallocated previous to that point. Humongous regions may be utilized to store objects that are significantly larger than the typical object size, referred to as "Humongous" objects. Objects may be designated as Humongous and stored in Humongous regions if their size is above a threshold, such as above fifty percent of the size of a region. Humongous objects may be designated as Humongous objects when allocated rather than as Young objects. Thusly, Humongous objects will never be stored in Young regions. Generally, a Humongous region only stores one object, though it may only store part of an object that is too large to fit in one region. In such a case, a single Humongous object may be stored across multiple Humongous regions.

The Garbage-first garbage collector treats objects that are designated as Young objects differently from objects that are designated as Old objects on the assumption that most objects can be deallocated within a short period of time after allocation. Based on this assumption, the Garbage-first garbage collector attempts to collect Young regions more frequently than Old regions in hopes of reclaiming a maximum amount of heap space for a minimum amount of garbage collection work. The Garbage-first garbage collector may attempt to collect all Young regions every time it performs a collection but may attempt to collect Old regions only part of the time that it performs collections and may only reclaim Humongous regions at the end of marking cycles when they do not contain any marked objects.

For example, the Garbage-first garbage collector may perform a marking cycle upon a triggering event, such as when seventy percent of the heap has been allocated. The garbage collector marks all reachable objects and uses the marking information to create a "marking cycle list" of Old regions, ranked by garbage collection efficiency, to attempt to collect the next time a collection is performed. At the end of a marking cycle, the garbage collector also reclaims any Old regions or Humongous regions that do not contain any marked objects. If a garbage collection occurs after a marking cycle has been performed and worthwhile Old regions remain on the marking cycle list, the garbage collector may collect all Young regions and a number of Old regions on the marking cycle list. If a garbage collection occurs previous to the performance of a marking cycle and/or if no worthwhile Old regions remain on the marking cycle list, the garbage collector may only collect Young regions.

Further, the Garbage-first garbage collector processes Humongous regions differently from Young regions and Old regions. For example, when collecting Young regions and Old regions, the Garbage-first garbage collector copies reachable objects from the region being collected to a different region and then the entire region being collected is reclaimed. When processing Humongous regions, Humongous objects are not copied. Rather, if the Humongous object or partial Humongous object stored in the Humongous region is reachable, the Humongous region is left in place. However, if the Humongous object or partial Humongous object stored in the Humongous region is not reachable, the Humongous region is directly reclaimed without any copying to a different region.

Thus, the Garbage-first garbage collector typically spends a small amount of garbage collection time processing Humongous regions in relation to the amount of heap space that may potentially be reclaimed. This is in part due to the fact that the garbage collector is only required to determine whether one object is reachable when the garbage collector collects a Humongous region. The ratio between the amount of heap space that may be reclaimed and the amount of garbage collection time spent by the Garbage-first garbage collector may be increased through more frequent processing of Humongous regions.

SUMMARY

The present disclosure describes systems, methods, and computer program products for garbage collection that provide prompt reclamation of large objects. A heap space is divided into a plurality of Young regions, Old regions, and Humongous regions. During the execution of a program, for each region, a remembered set is created and maintained, which specifies the locations of references from other regions into that region. A "garbage collection list" is generated specifying regions to perform garbage collection on. All Young regions are included in the garbage collection list. At least one Humongous region is selected and included in the garbage collection list. It may be determined to include one or more Old regions in the garbage collection list. If so, the Old regions are selected and included in the garbage collection list. Then, a garbage collection is performed on the regions specified in the garbage collection list. During the garbage collection, the remembered set for each region is utilized to determine reachable objects in the region, ensuring that reachable objects are not deallocated.

All Humongous regions may be selected when Humongous regions are selected for inclusion in the garbage collection list. Alternatively, only a subset of the Humongous regions may be selected when Humongous regions are selected for inclusion in the garbage collection list.

The determination to include Old regions in the garbage collection list may include determining whether worthwhile Old regions remain on a marking cycle list generated by a previous marking cycle. If worthwhile Old regions remain on a marking cycle list, a number of the Old regions on the marking cycle list may be added to the garbage collection list.

The present disclosure reclaims large objects more promptly than conventional garbage collection processes while expending a minimal amount of additional garbage collection time. Each Humongous region has exactly one object, or part of a single object, and therefore Humongous regions may be reclaimed by checking whether just one object is reachable. Because of this, garbage collecting Humongous regions during the more frequently performed garbage collections, as opposed to reclaiming Humongous regions following the less frequently performed marking cycles, expends only a small amount of processing time to check whether the one object in each Humongous region is reachable and may reclaim a large amount of memory. As a result, more of the heap may be available at a given time to allocate to new objects and marking cycles are triggered less frequently. This saves the processing time that would have been required for more frequent marking cycles and results in a more efficient use of heap space.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood and its numerous features made apparent to those skilled in the art by referencing the accompanying drawings.

DETAILED DESCRIPTION

The present disclosure describes a garbage collection process that provides prompt reclamation of large objects. In one possible implementation, a heap space is divided into a plurality of regions including a plurality of Young regions, a plurality of Old regions, and a plurality of Humongous regions. A remembered set is maintained for each region specifying where there are references from outside the region to inside the region. When performing a garbage collection, a garbage collection list is created specifying the regions where garbage collection will be performed. All of the Young regions are included in the garbage collection list. In one example, at least one of the Humongous regions is selected and included in the garbage collection list as well. It may be desirable to occasionally include one or more Old regions in the garbage collection list as well. Such selection may be based on information gathered in a previously completed marking cycle. If Old regions are selected, they are included in the garbage collection list. Then, a garbage collection is performed on the regions specified in the garbage collection list. The garbage collection utilizes the remembered set for each region as part of determining whether reachable objects are stored in that region, as objects in the region may be reachable because they are referenced by objects in other regions that are not part of the garbage collection.

Figure 1:
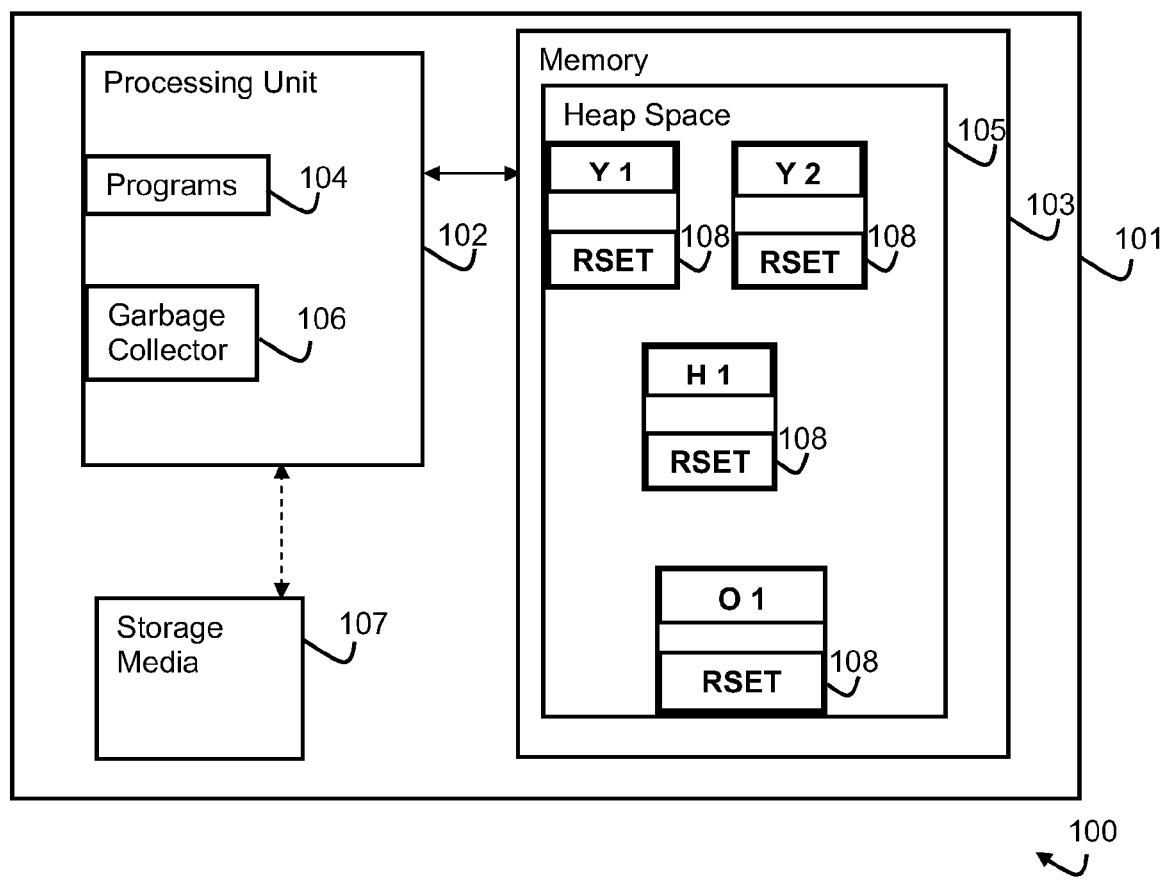
FIG. 1 is a block diagram illustrating a system 100 for performing garbage collection, in accordance with an embodiment of the present disclosure.

FIG. 1 illustrates one example of a system 100 for performing garbage collection, in accordance with an embodiment of the present disclosure. The system 100 has a computing device 101 which includes a processing unit 102 communicably coupled to a memory 103. The processing unit 102 is configured to execute instructions implementing any number of possible programs 104 as well as a garbage collector 106. The memory 103 includes a heap space 105 for the programs 104. While the system 100 has been described as including computing device 101, a processing unit 102, and a memory 103, it will be understood that system 100 is illustrative and that multiple computing devices 101, which may be communicably coupled; dual core, multiple core, parallel processing, and other processing unit 102 configuration; and/or multiple memories 103 and types of memory 103 such as random access memory, read-only memory, flash memory, cache memory, on-chip memory, off-chip memory, and etc. may be utilized without departing from the scope of the present disclosure.

The computing device 101 may also include one or more tangible machine-readable storage media, communicably coupled to the processing unit 102 and/or the memory 103, which may include, but are not limited to, magnetic storage media such as a floppy diskette; optical storage media such as a CD-ROM; magneto-optical storage media; read only memory; random access memory; erasable programmable memory such as EPROM or EEPROM; flash memory; or other types of media suitable for storing electronic information. The computing device 101 may also include, not shown, one or more input and/or output devices such as displays, keyboards, mice, printers, scanners, and so forth; one or more buses such as universal serial bus, small computer system interface, and so forth; and/or one or more communication components such as modems, Ethernet adapters, wireless Ethernet adapters, and so forth. The instructions the processing unit 102 executes to implement the one or more programs 104 and a garbage collector 106 may be stored in the memory 103 and/or the storage media 107.

Figure 2A:
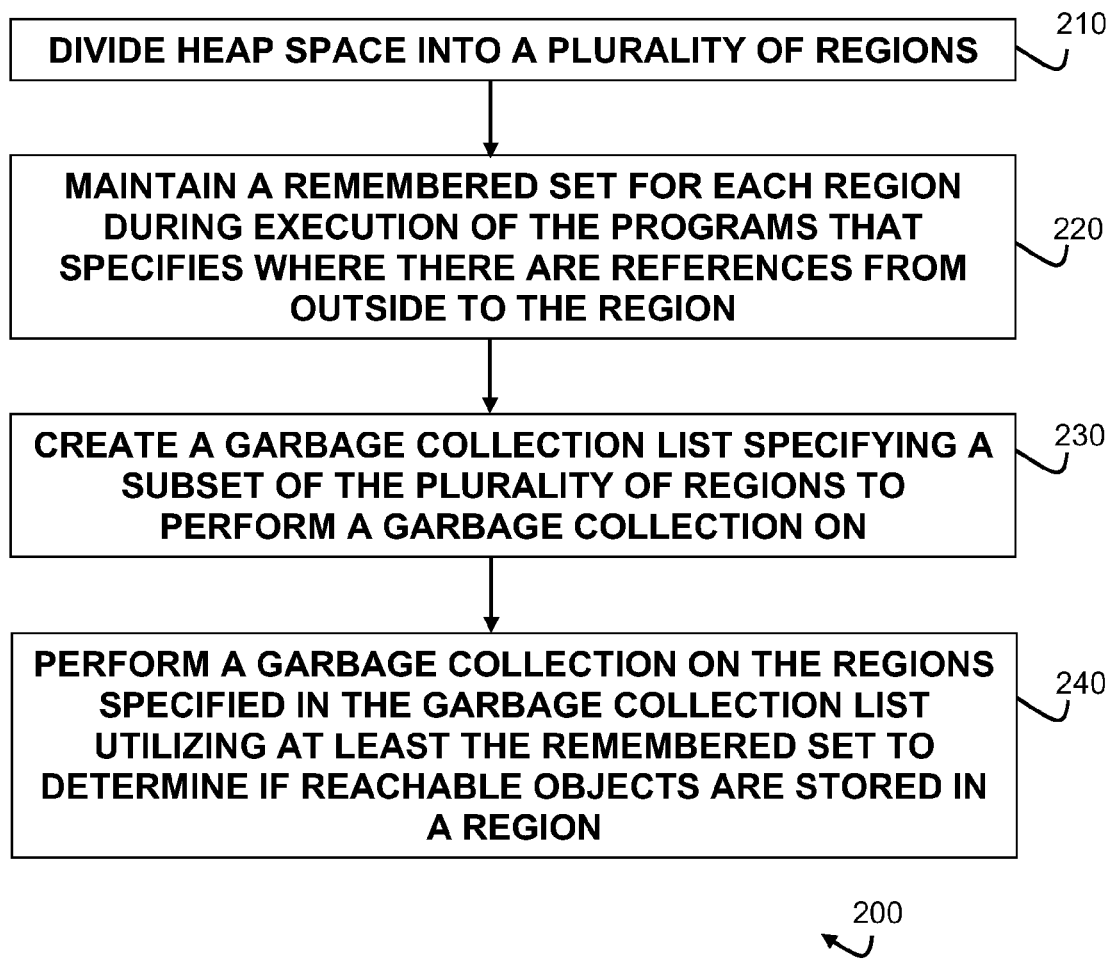
FIG. 2A is a method diagram illustrating a method for garbage collection, which may be performed by the system of FIG. 1, in accordance with an embodiment of the present disclosure.

FIG. 2A illustrates a method 200 for garbage collection, which may be performed by the system 100, in accordance with an embodiment of the present disclosure. The method 200 is a computer-implemented method, and as such is performed by a processing unit, such as the processing unit 101, executing one or more sets of instructions included in a computer program product stored in a machine-readable medium, such as the memory 103.

In a first operation 210, the garbage collector 106 divides the heap space 105, for one or more programs executing on the processing unit 102, into a plurality of regions. The size of each of the plurality of regions may or may not be equal. The example implementation discussed herein refers to equal sizing of heap space regions. The plurality of regions may also include one or more Young regions, one or more Old regions, and one or more Humongous regions. The Young regions may each be operable to contain one or more Young objects for the one or more programs and the Old regions may each be operable to contain one or more Old objects for the one or more programs. The Humongous regions may each be operable to contain at most one Humongous object for the one or more programs. Further, in one specific implementation, in the event a Humongous object is too large for one Humongous region, the Humongous region stores a portion of Humongous object and the remaining Humongous object is stored across a group of Humongous regions. Although the present discussion describes dividing the heap into a plurality of Young regions, Old regions, and Humongous regions, it is understood that the heap may have several empty regions which will as necessary be subsequently used as Young regions, Old regions, or Humongous regions.

In a second operation 220, the garbage collector 106 maintains a remembered set in the memory 103 for each region, during execution of the programs, specifying where there are references from outside the respective region to inside the respective region. The garbage collector 106 incrementally updates the remembered set for each region during the execution, as the references from outside the respective region to inside the respective region change, based on information made available by the executing programs. The remembered set for each region may be a remembered set of references 108 into that region and may be stored within that region. In one possible implementation, the remembered set for each region does not include references to that region from Young regions, as garbage collections already include all Young regions and thusly objects that are reachable from Young regions can be easily ascertained during garbage collection.

In a third operation 230, the garbage collector 106 creates a garbage collection list in the memory 103 specifying a subset of the plurality of regions to collect. The operation of creating a given garbage collection list may include a number of sub-operations, shown in FIG. 2B.

Figure 2B:
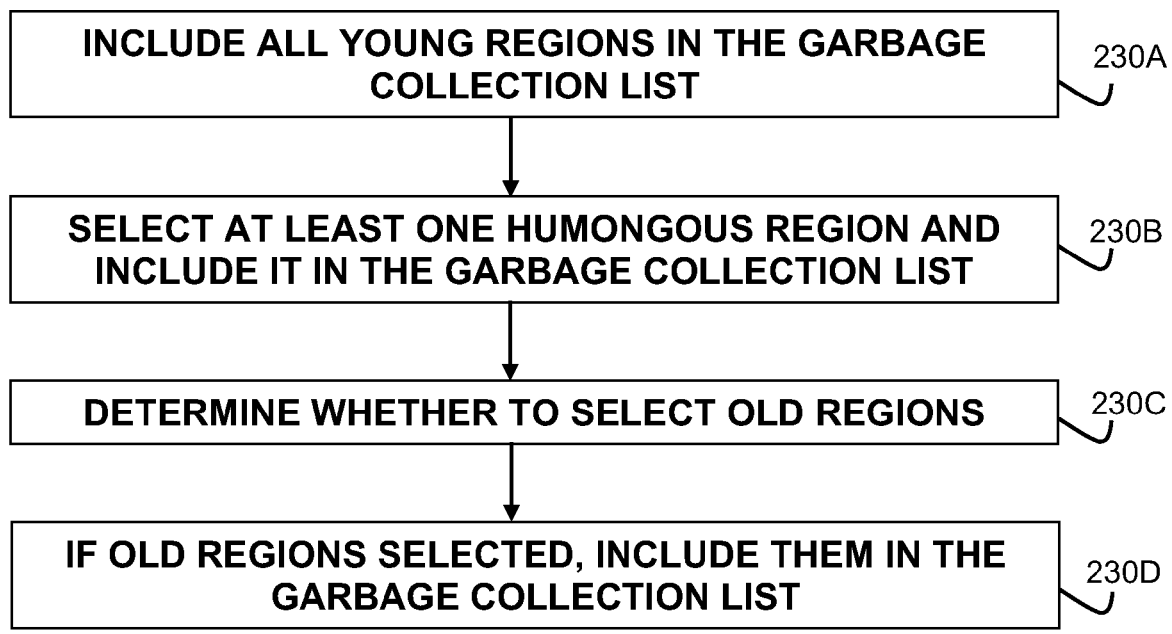
FIG. 2B is a method diagram illustrating sub-operations for creating a garbage collection list, which may be performed as part of the method of FIG. 2A in accordance with the present disclosure.

FIG. 2B illustrates sub-operations that may be involved in generating the garbage collection list. In a first sub-operation 230A, the garbage collector 106 includes all Young regions in the garbage collection list. In a second sub-operation 230B, the garbage collector 106 selects at least one Humongous region and includes it in the garbage collection list. The garbage collector 106 may utilize a variety of different criteria to select Humongous regions to include in the garbage collection list. In a first example, the garbage collector 106 may select all Humongous regions to include in the garbage collection list. In a second example, the garbage collector 106 may select all Humongous regions that have less than a threshold number of references, such as five, in their respective remembered set. In a third example, the garbage collector 106 may select all Humongous regions that store at least a portion of a Humongous object that has a size above a threshold, such as two-hundred kilobytes. In a fourth example, the garbage collector 106 may select all Humongous regions that store only a portion of a Humongous object rather than an entire Humongous object, such as Humongous regions that contain a portion of an object larger than the size of a region. In a fifth example, the garbage collector 106 may select all Humongous regions that store at least a portion of a Humongous object that has a size above a threshold size, such as two-hundred kilobytes. It is understood that these are only a few of the variety of different criteria that may be used to select Humongous regions to include in the garbage collection list.

In some implementations, the garbage collector 106 may select a fixed number of Humongous regions to include in the garbage collection list, such as ten. In a first example, the garbage collector 106 may select the Humongous region that has the fewest number of references in its respective remembered set to include in the garbage collection list until ten Humongous regions have been selected.

In a second example, the garbage collector 106 may keep a "selected Humongous region list" that indicates which of the Humongous regions have been selected for inclusion in the garbage collection list for previous garbage collections. In this second example, the garbage collector 106 may select ten Humongous regions that are not indicated as having been selected for previous garbage collections. The garbage collector 106 may then update the selected Humongous region list by indicating those ten Humongous regions as having been selected. If all Humongous regions are indicated in the selected Humongous region list as having been previously selected, the garbage collector 106 may clear the selected Humongous region list. In this way, the garbage collector 106 selects the fixed number of Humongous regions in a round robin fashion, ensuring that all Humongous regions will eventually be selected for inclusion in the garbage collection list.

In a third sub-operation 230C, the garbage collector 106 determines whether to select one or more Old regions. If the garbage collector 106 selects Old regions, the garbage collector 106 includes the selected Old regions in the garbage collection list.

Figure 3:
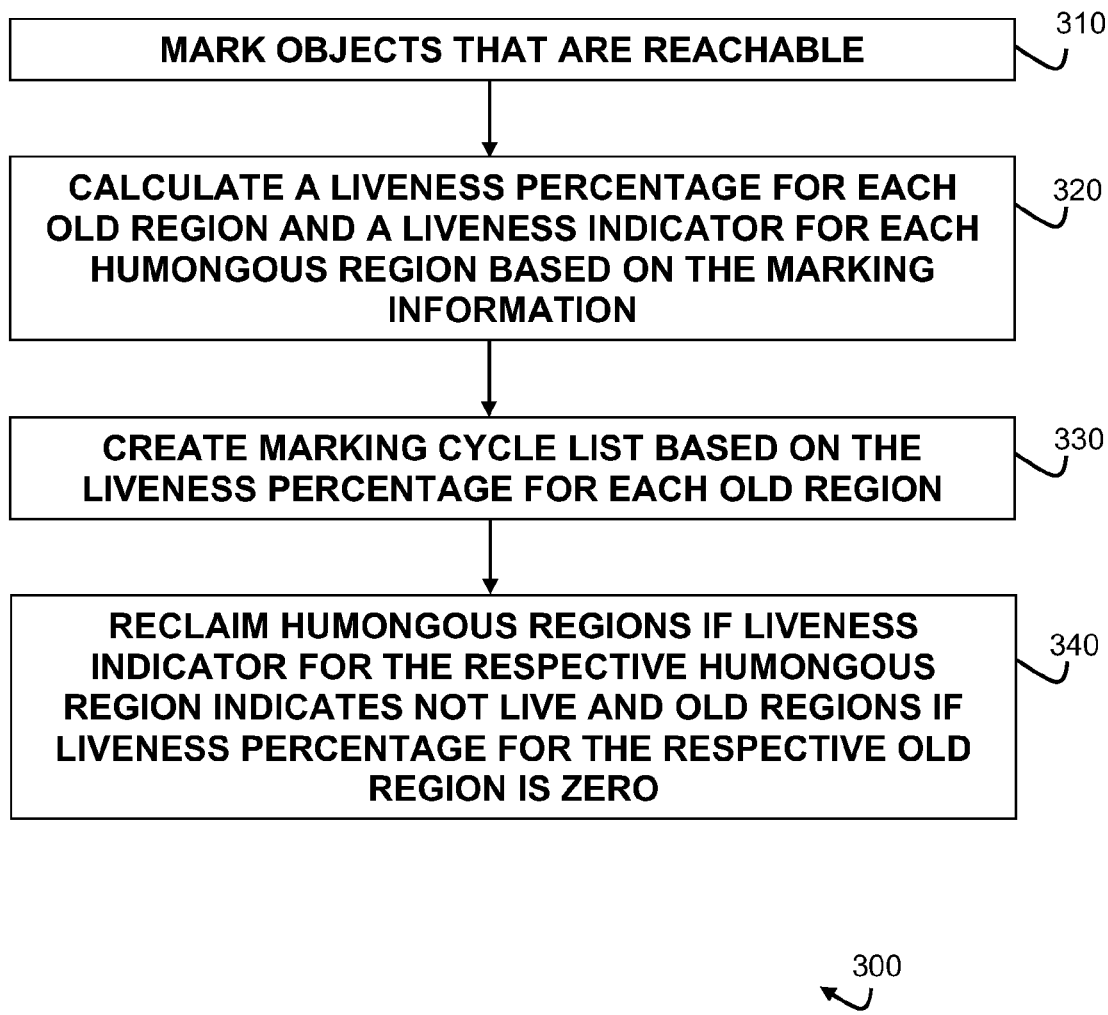
FIG. 3 is a method diagram illustrating a method for performing a marking cycle, which may be performed by the system of FIG. 1 in accordance with the present disclosure.

For example, the garbage collector 106 may perform marking cycles, such as the marking cycle performed by the method 300 illustrated in FIG. 3, to generate a marking cycle list upon the occurrence of a triggering event. The garbage collector 106 may then decide to include in the garbage collection list one or more worthwhile Old regions remaining on a marking cycle list generated by a previously performed marking cycle. Old regions on the marking cycle list may be ranked according to a metric relating to the estimated efficiency of garbage collecting each of the Old regions. For instance, an Old region on the marking cycle list may not be worthwhile for garbage collection if it contains a large number of reachable objects, if the garbage collection list already includes a large number of Young regions and/or Humongous regions, and so on. Conversely, an Old region on the marking cycle list may be worthwhile for garbage collection if it contains a small number of reachable objects, if the garbage collection list only currently includes a small number of Young regions and/or Humongous regions, and so on.

Referring again to FIG. 2A, in a fourth operation 240, the garbage collector 106 performs a garbage collection on the regions specified in the garbage collection list utilizing at least the remembered set for each region to determine if reachable objects are stored in that region. An object is reachable if it is referenced directly or transitively starting from the root set. Thus, the garbage collector 106 can determine if objects in the regions in the garbage collection list are reachable by following references from the root set and from the remembered sets for the respective regions transitively to objects in those regions. In one implementation, the garbage collector 106 may be a garbage-first garbage collector. Thus, during garbage collection, the garbage collector 106 collects Young regions and/or Old regions by determining if any objects in the regions are reachable by following references to objects, copying each referenced object that has not previously been encountered into a different region, and reclaiming the Young regions and/or Old regions once all reachable objects have been copied. Further, the garbage collector 106 may collect a Humongous region by determining whether the remembered set for the Humongous region includes a reference to the region from outside the region, marking the Humongous region as processed if there is a reference to the Humongous region, and only reclaiming the Humongous region if it is not marked as processed at the end of garbage collection.

FIG. 3 illustrates a marking cycle method 300 the system 100 may perform upon the occurrence of a triggering event. The triggering event may include the percentage of free space in the heap, i.e. space in the heap that has not already been allocated to objects, falling below a threshold, such as thirty percent. In a first operation 310, the garbage collector 106 marks all objects in the heap that are reachable.

In a second operation 320, the garbage collector 106 calculates a liveness percentage, or the percentage of an Old region occupied by live objects, for each Old region and a liveness indicator for each Humongous region based on the marking information. Objects are live if they have been marked and are non-live if they have not been marked. For example, the garbage collector 106 may utilize the marking information from operation 310 to determine that twenty-five percent of an Old region is allocated to reachable objects. Thus, the garbage collector 106 calculates that the Old region has a liveness percentage of twenty-five percent. By way of another example, the garbage collector 106 may utilize the liveness information from operation 310 to determine that a Humongous region stores at least a portion of a reachable Humongous object. Thus, the garbage collector 106 calculates that the Humongous region has a liveness indicator of live. By way of still another example, the garbage collector 106 may utilize the liveness information from operation 310 to determine that a Humongous region does not store at least a portion of a reachable Humongous object. Thus, the garbage collector 106 calculates that the Humongous region has liveness indicator of non-live.

In a third operation 330, the garbage collector 106 creates a marking cycle list based on the liveness percentage for each Old region. For example, the garbage collector 106 may include all Old regions that have a liveness percentage less than a threshold, such as ten percent, in the marking cycle list. In another example, the garbage collector 106 may include a fixed number of Old regions, such as fifteen, with the lowest liveness percentage in the marking cycle list. The garbage collector 106 may order the Old regions on the marking cycle list according to the estimated efficiency of garbage collecting each of the Old regions.

The method 300 may also include a fourth operation 340. In the fourth operation 340, the garbage collector 106 reclaims Humongous regions if the liveness indicator for the respective Humongous region indicates non-live. The garbage collector 106 may also reclaim Old regions if the liveness percentage for the respective Old region is zero.

Figure 4:
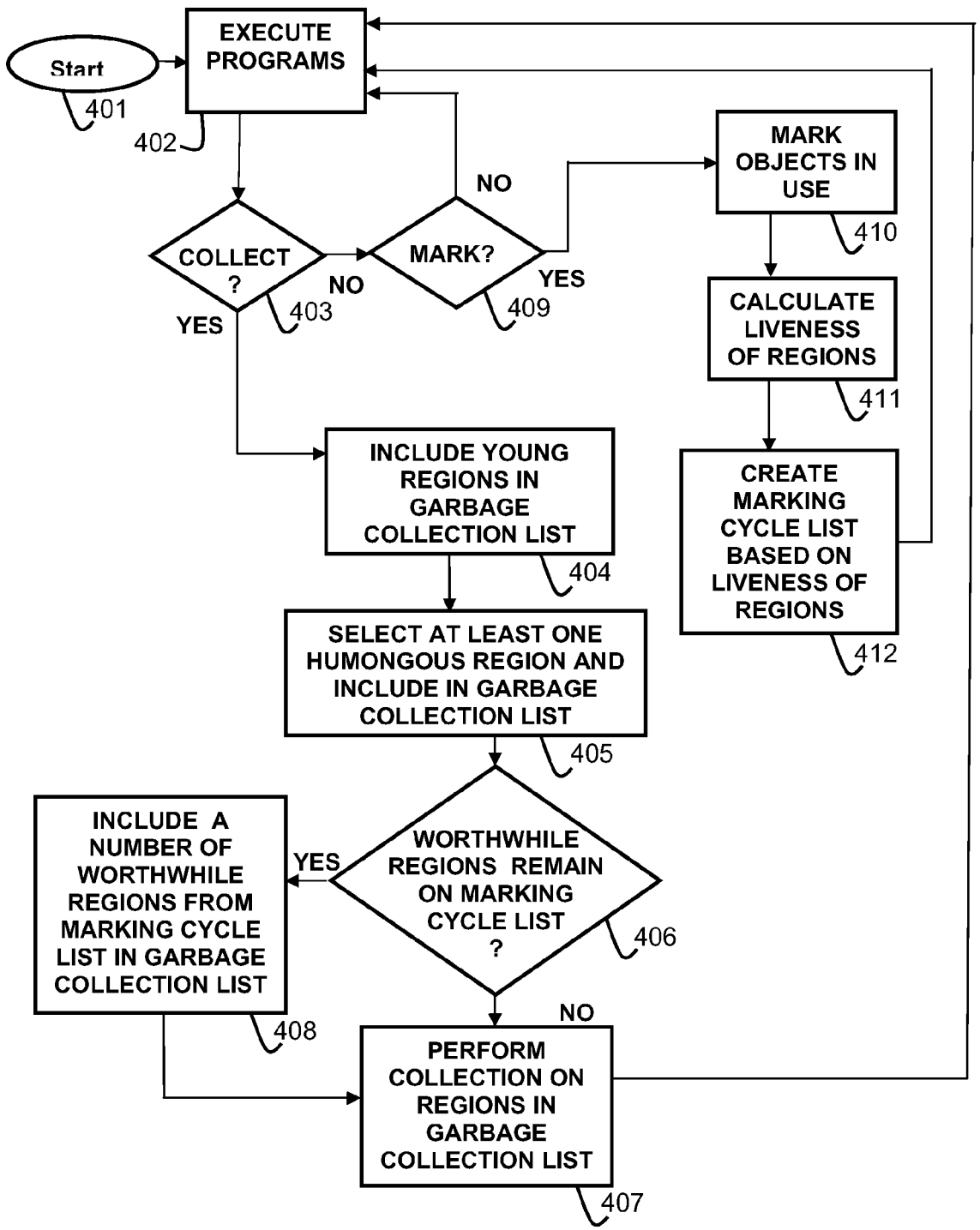
FIG. 4 is a flow chart illustrating an example flow of an implementation of the methods of FIGS. 2 and 3 in accordance with the present disclosure.

FIG. 4 illustrates the flow of an example implementation of the methods of FIGS. 2A and 3 performed by the system 100. It is understood that although FIG. 4 illustrates garbage collection 403-408 and marking 409-412 as separate, mutually exclusive flows, this is merely illustrated in this fashion for visual clarity. In various implementations, garbage collection 403-408 and marking 409-412 may be performed concurrently, or substantially concurrently. For example, garbage collections may be performed at frequent intervals and a marking cycle may be initiated when a certain percentage of the heap space is allocated, such as eighty percent. Once a marking cycle has been initiated, the garbage collector 106 may interrupt the marking cycle in order to perform a garbage collection. After that garbage collection completes, the garbage collector 106 may resume the suspended marking cycle. Multiple garbage collections may even be performed before the marking cycle completes. One or more garbage collections that are performed subsequent to the completion of a marking cycle may then collect a number of worthwhile Old regions that remain on the marking cycle list created by the completed marking cycle.

In FIG. 4, the flow starts at block 401 where the system 100 initializes an execution environment, such as a Java Virtual Machine, for executing one or more programs and proceeds to block 402. As part of initializing the execution environment, the system 100 divides a heap space for the one or more programs into a plurality of Young regions, Old regions, and Humongous regions. Also as part of initializing the execution environment, the system 100 allocates and stores objects in the plurality of regions for the one or more programs. The system 100 also creates remembered sets for each of the plurality of regions specifying where there are references from outside the respective region into the respective region. At block 402, the system 100 executes one or more programs. During execution of the programs, the system 100 incrementally maintains the remembered sets for regions that specify where there are references from outside the respective region into the respective region, updating the references as they change during execution.

From block 402, the flow proceeds to block 403. At block 403, the system 100 determines whether or not to perform a garbage collection. If the system 100 determines to perform a garbage collection, the flow proceed to block 404. If the system 100 determines not to perform a garbage collection, the flow proceeds to block 409.

At block 404, the system 100 includes all Young regions in the garbage collection list and the flow proceeds to block 405. At block 405, the system 100 selects one or more Humongous regions and includes the selected Humongous region or regions in the garbage collection list. The flow then proceeds to block 406 where the system 100 determines whether worthwhile Old regions remain on a marking cycle list generated by a previously performed marking cycle. If worthwhile Old regions do not remain on a marking cycle list generated by a previously performed marking cycle, the flow proceeds to block 407. If worthwhile Old regions remain on a marking cycle list generated by a previously performed marking cycle, the flow proceeds to block 408. Old regions on the marking cycle list may be ranked according to the estimated efficiency of garbage collecting each of the Old regions. As such, Old regions listed on the marking cycle list may not be worthwhile to perform garbage collection on if the Old regions contain a large number of reachable objects, if a large number of Young regions and/or Humongous regions are already on the garbage collection list, and so on. Further, Old regions listed on the marking cycle list may be worthwhile to perform garbage collection on if the Old regions contain a small number of reachable objects, if the garbage collection list only currently includes a small number of Young regions and/or Humongous regions, and so on. The number of Old regions that garbage collector 106 selects from the marking cycle list to include in the garbage collection list may be based on the garbage collection efficiency of collecting Old regions in light of the number of Young regions and/or Humongous regions already included in the garbage collection list.

At block 407, the system 100 performs a garbage collection on the regions specified in the garbage collection list. The flow then returns to block 402.

At block 408, the system 100 includes a number of worthwhile Old regions remaining on the marking cycle list. The flow then proceeds to block 407.

At block 409, the system 100 determines whether or not to perform a marking cycle. If the system 100 determines to perform a marking cycle, the flow proceed to block 410. If the system 100 determines not to perform a marking cycle, the flow proceeds to block 402.

At block 410, the system 100 marks all objects in the heap that are reachable and the flow proceeds to block 411. At block 411, the system 100 calculates the liveness of Old and Humongous regions based on the marked objects and the flow proceeds to block 412. At block 412, the system 100 creates a marking cycle list based on the liveness of Old regions and reclaims any non-live Humongous regions and Old regions not containing any live objects. The system 100 ranks the Old regions on the marking cycle list according to the efficiency of garbage collecting each of the Old regions. The flow then returns to block 402.

By way of example of the methods of FIGS. 2A, 2B, and/or 3, FIGS. 5A through 5F illustrate garbage collection for one or more programs. In this example, the programs may be Java™ programs and the garbage collection may be performed by a generational region based copying garbage collector configured to conform with aspects of the method of FIGS. 2A, 2B, and/or 3 or some alteration thereof.

Figure 5A:
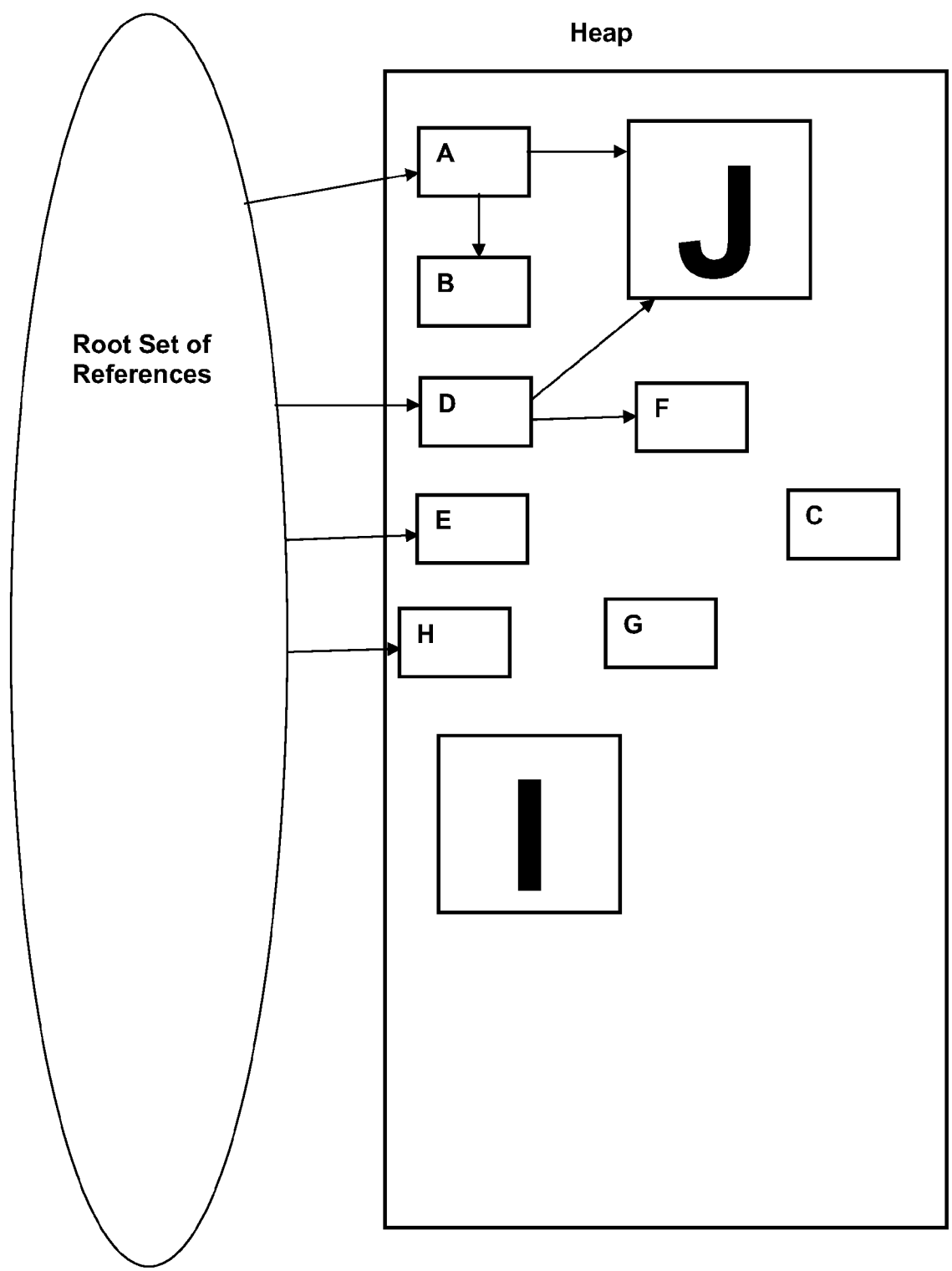
FIG. 5A is a block diagram illustrating a structure of references between objects created for one or more executing programs and stored in a garbage-collected heap.

FIG. 5A is a block diagram illustrating the structure of references in a heap 510. The root set of references may include references from anywhere in the call stack of the one or more programs, local variables and parameters in functions currently being invoked, and any global variables. The root set of references includes external references to objects in the heap 510. As illustrated, the heap includes memory that has been allocated to Young objects A, B, and C; Old objects D, E, F, G, and H; and Humongous objects I and J. The root set of references includes external references to Young object A and Old objects D, E, and H. Young object A references Young object B and Humongous object J. Old object D references Old object F and Humongous object J. Young object C, Old object G, and Humongous object I are not referenced by the root set of references or any other object. Thus, Young objects A and B; Old objects D, E, F, and H; and Humongous object J are all reachable whereas Young object C, Old object G, and Humongous object I are all not reachable.

Figure 5B:
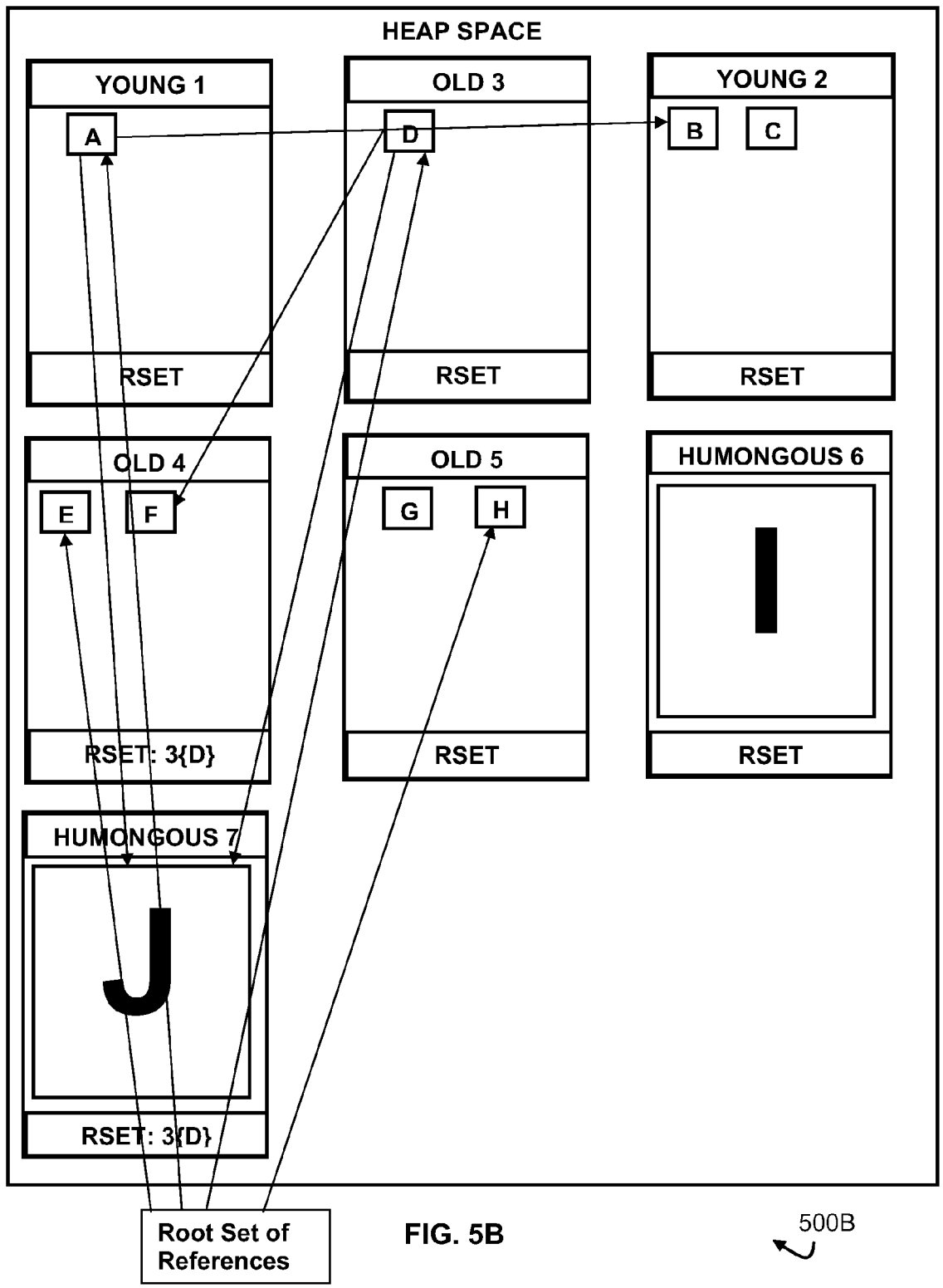
FIG. 5B is a block diagram illustrating the layout of the objects of FIG. 5A into regions of the heap space for one or more executing programs.

FIG. 5B is a block diagram illustrating a heap space 500B that stores heap 510 for the one or more programs. As illustrated, the heap space 500B has been divided into a plurality of regions. The plurality of regions includes Young regions 1 and 2; Old regions 3, 4, and 5; and Humongous regions 6 and 7. Memory in the heap space 500B has been allocated to Young objects A, B, C; Old objects D, E, F, G, and H; and Humongous objects I and J. The structure of references illustrated in FIG. 5A is also illustrated in FIG. 5B. As illustrated, Young object A is stored in Young region 1, Young objects B and C are stored in Young region 2, Old object D is stored in Old region 3, Old objects E and F are stored in Old region 4, Old objects G and H are stored in Old region 5, Humongous object I is stored in Humongous region 6, and Humongous object J is stored in Humongous region 7.

In this example, references into a region from a Young region are not included in the remembered set for the region. As illustrated by the structure of references illustrated in FIG. 5A, the remembered set for Old region 4 is illustrated in FIG. 5B as including a reference from Old region 3 that corresponds to the reference to Old object F from Old object D and the remembered set for Humongous region 7 is illustrated as including a reference from Old region 3 that corresponds to the reference to Humongous object J from Old object D. The remembered set of Young region 2 is illustrated as empty because the only reference into Young region 2 is a reference to Young object B from Young object A, which is a reference from a Young region. Similarly, the remembered set for Humongous region 6 is illustrated as empty because there are no references into Humongous region 6. It should be noted that the remembered set for Humongous region 7 is not illustrated as including a reference from Young region 1 that corresponds to the reference from Young object A to Humongous object J because Young region 1 is a Young region. Further, the remembered sets for Young region 1, Old region 3, and Old region 5 are illustrated as empty because the references into those regions are both from the root set and references from the root set are not included in remembered sets in this example.

Each object has a forwardee field. During a garbage collection, if a Young object or an Old object has not been copied yet, the value of the forwardee field for that object will indicate that it has not been copied. If the object has been copied to a different region, the value of the forwardee field will indicate the location where the object has been copied to. During garbage collection, objects that are reachable for each of the regions to be collected are determined utilizing the remembered set for that region. Objects referenced from the root set are visited. Objects referenced in the remembered set for the region they are stored in are also visited. Objects referenced by other objects that have already been visited are visited as well. When a Young object or an Old object is first visited, the object is copied from the region it was previously stored in to a destination region. The forwardee field for that object is updated with the location of where the object has been copied. All references to that object are updated to the new location. If the object is visited again, its forwardee field indicates the object has already been copied and thus the object is not copied again. Instead, the reference to the object is updated to point to the new location specified in the forwardee field. In this way, all references to the object are eventually updated to point to its new location. After all reachable objects have been determined and any copying has taken place, the collected regions are reclaimed.

Figure 5C:
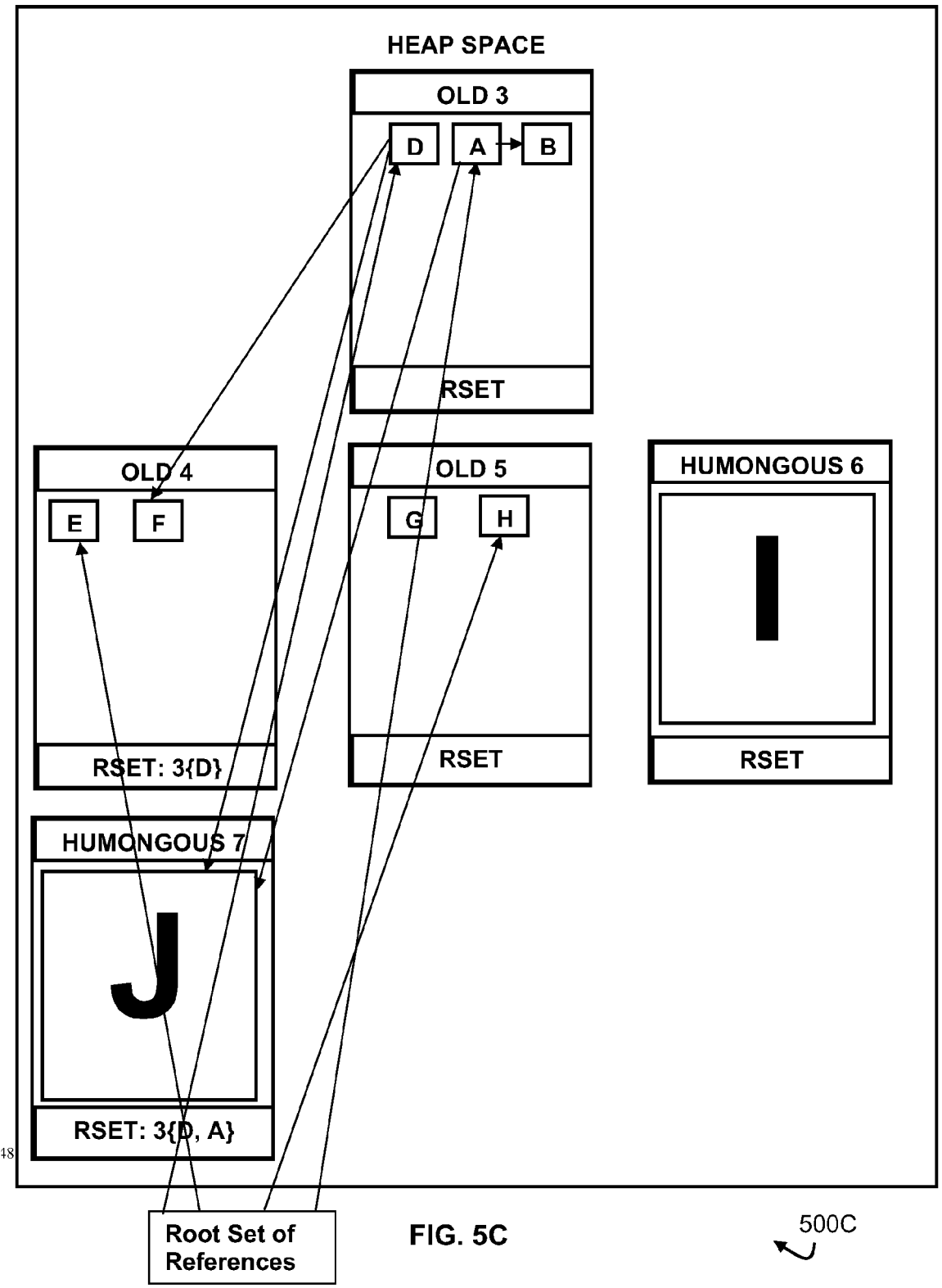
FIG. 5C is a block diagram illustrating the heap space of FIG. 5B after a conventional garbage collection has been performed.

FIG. 5C illustrates the heap space 500C after the performance of an example conventional garbage collection that does not include any Humongous regions on heap space 500B where worthwhile Old regions do not remain on a marking cycle list generated by a previously performed marking cycle. Thus, all Young regions will be collected but no Old regions or Humongous regions will be collected.

Thus, as illustrated in FIG. 5C, objects A and B have been copied to Old region 3 and Young regions 1 and 2 have been reclaimed. Because Young object C was not copied during garbage collection, as it was not reachable, Young object C has been deallocated by reclaiming Young region 1.

It should be noted that objects A and B are now stored in an Old region. As such, objects A and B have been "promoted". Although Young objects A and B are shown and described as being promoted during garbage collection it is understood that Young objects may be copied to a different Young region, thus not promoting the Young objects, without departing from the scope of the present disclosure. Further, Young objects A and B are shown and described as both being copied to the same Old region. However, a garbage collection may copy objects to more than one region without departing from the scope of the present disclosure.

It should also be noted that Old object G and Humongous object I are still present in the heap space 500C even though they are not reachable. This is because the respective regions they are stored in were not collected during the conventional garbage collection example.

Figure 5D:
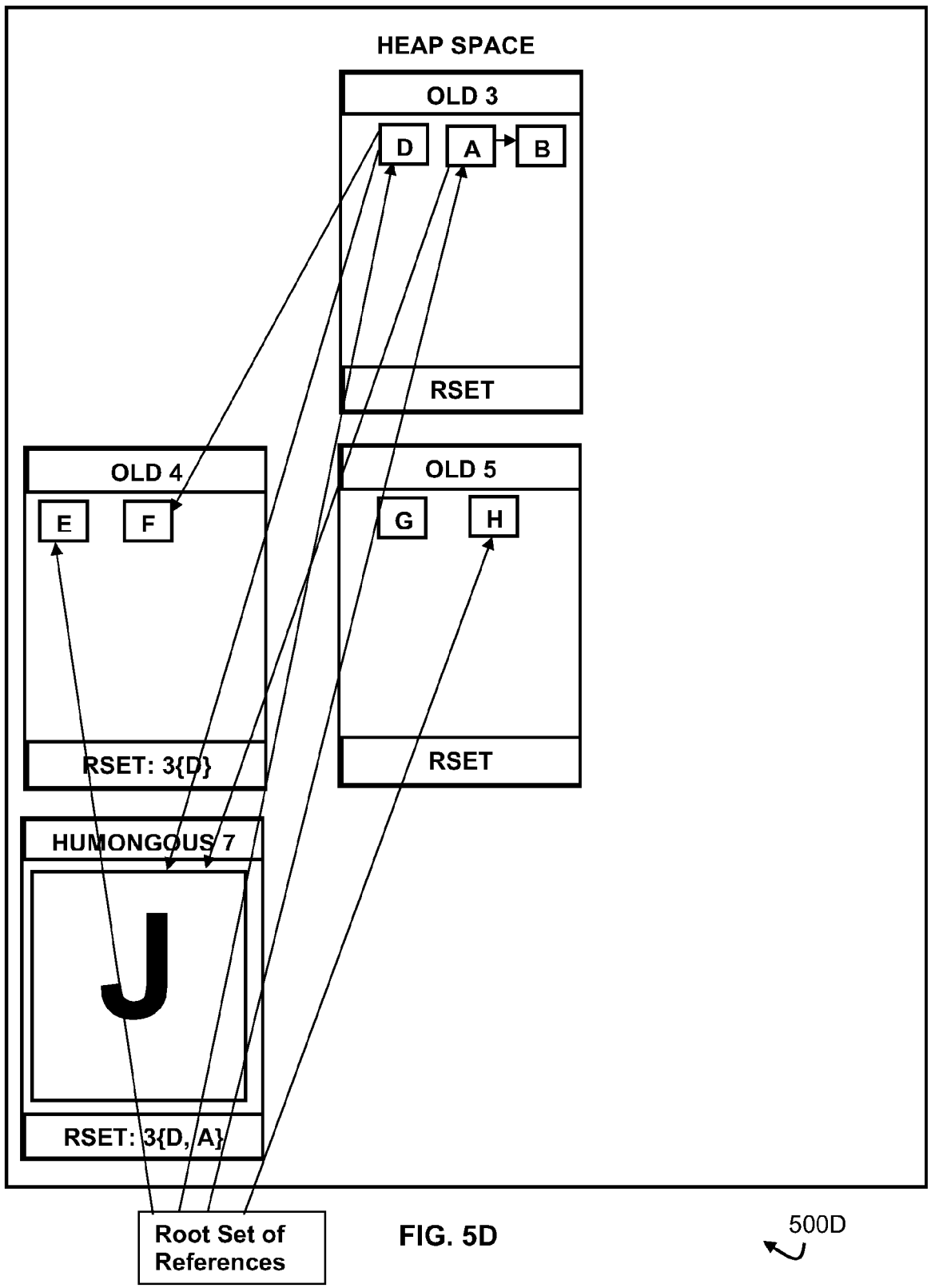
FIG. 5D is a block diagram illustrating the heap space of FIG. 5B after an example garbage collection in accordance with the present disclosure has been performed.

FIG. 5D illustrates the heap space 500D after the performance of an example garbage collection on heap space 500B that includes at least one Humongous region where worthwhile Old regions do not remain on a marking cycle list generated by a previously performed marking cycle. Thus, all Young regions and at least one Humongous region will be collected but no Old regions. In this example, the at least one Humongous region selected for garbage collection is all Humongous regions. Thus, Humongous regions 6 and 7 will be collected along with Young regions 1 and 2.

During garbage collection in this garbage collection example, objects that are reachable for each of the regions are determined utilizing the remembered set for that region. Objects referenced by references in the root set of references are visited. Objects referenced in the remembered set for the region they are stored in are also visited. Objects referenced by other objects that have already been visited are visited as well. Before Young and Old objects are visited, their forwardee fields contain a value that indicates that they have not been copied. Before Humongous objects are visited, their forwardee fields contain a value that indicates that they have not been processed.

When a Young object or Old object is first visited, the object is copied from the region it was previously stored in to a destination region. The forwardee field for that object is updated with the location of where the object has been copied. All references to that object are updated to the new location. If the object is visited again, the new location in the forwardee field indicates the object has already been copied and thus the object is not copied again. When a Humongous object is first visited, the forwardee field is updated with a value to reflect that the Humongous object has been processed but the Humongous object is not copied. In some implementations, the forwardee field of the Humongous object may be updated with its own location. In such implementations, the Humongous object is visited again, the Humongous object's own location in the forwardee field indicates the Humongous object has already been processed and the Humongous object will not be processed again. In this example, after all reachable objects have been determined and any copying has taken place, the collected Young and Old regions are reclaimed. Further, all collected Humongous regions that store at least a portion of an object that is not indicated as having been processed in the forwardee field are reclaimed as well.

Thus, as illustrated in FIG. 5D, objects A and B have been copied to Old region 3 and Young regions 1 and 2 and Humongous region 6 have been reclaimed. Because Young object C was not copied during garbage collection, as it was not reachable, Young object C has been deallocated by reclaiming Young region 1. Because the forwardee field of Humongous object I was not updated with a value to indicate that it was visited during garbage collection, because it was not visited, Humongous region 6 was reclaimed and Humongous object I was deallocated.

It should also be noted that Old object G is still present in the heap space 500C even though it is not reachable. This is because the region it is stored in was not collected during this garbage collection example.

Figure 5E:
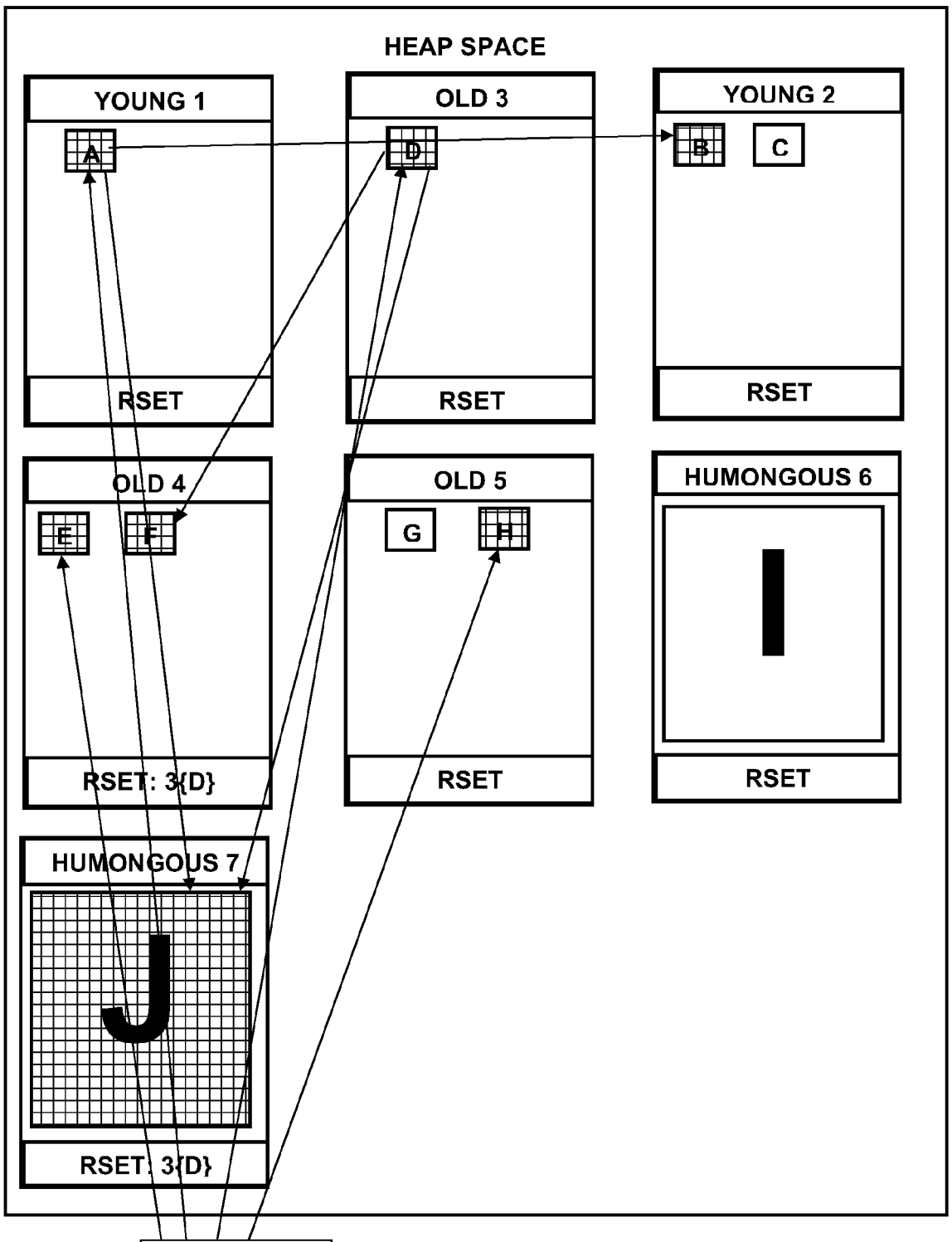
FIG. 5E is a block diagram illustrating the heap space of FIG. 5B after the performance of a marking cycle in accordance with the present disclosure.

FIG. 5E illustrates the heap space 500E after the performance of an example marking cycle on heap space 500B. It is understood that although this example describes the marking cycle as marking Young objects, some implementations may not mark Young objects during marking cycles under the assumption that Young objects will either be reclaimed while Young or will be promoted into Old regions. In this example, the objects in the heap space 500B that are reachable, based on the structure of references illustrated in FIG. 5A, are marked. As illustrated, Young objects A and B; Old objects D, E, F, and H; and Humongous object J are marked. A liveness percentage is calculated for each of the Old regions based on the reachable Old objects that are stored in the respective region and a marking cycle list is created based on the liveness percentages. In this example, a liveness percentage of 100% is calculated for Old region 3, a liveness percentage of 100% is calculated for Old region 4, and a liveness percentage of 50% is calculated for Old region 5. In this example, only one Old region with the lowest liveness percentage is included in the marking cycle list. Thus, Old region 5 is included in the marking cycle list.

A liveness indicator is also calculated for each of the Humongous regions based on whether at least a portion of a reachable Humongous object is stored within the respective Humongous region and Humongous regions that are not indicated as live are reclaimed. In this example, a liveness indicator of non-live is calculated for Humongous region 6 and a liveness indicator of live is calculated for Humongous region 7. Hence, Humongous region 6 is reclaimed and Humongous object I is deallocated. Thus, the marking cycle list created in connection with FIG. 5E included Old region 5.

Figure 5F:
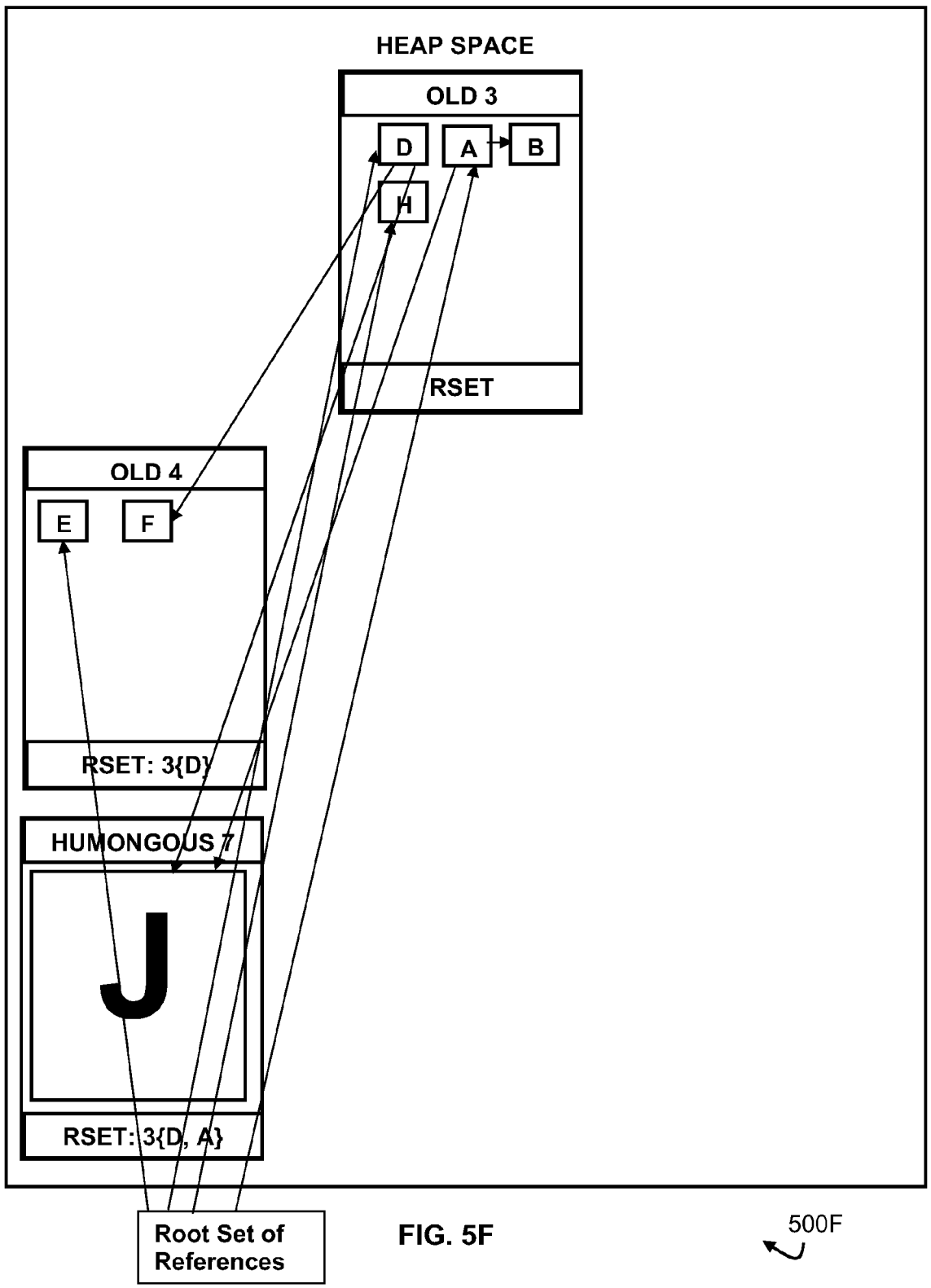
FIG. 5F is a block diagram illustrating the heap space of FIG. 5B after another example garbage collection in accordance with the present disclosure has been performed.

FIG. 5F illustrates the heap space 500F after the performance of another example garbage collection on heap space 500B where the marking cycle illustrated in FIG. 5E has taken place since the performance of the last garbage collection. Thus, all Young regions, at least one Humongous region, and any worthwhile Old regions listed in the marking cycle list will be collected. In this example, the at least one Humongous region selected for garbage collection is all Humongous regions. Also in this example, Old region 5 is determined to be worthwhile to garbage collect because Old region 5 has a liveness percentage of only 50% and only 3 Young or Humongous regions are already on the garbage collection list. Thus, Humongous region 7 and Old region 5 will be collected along with Young regions 1 and 2.

Thus, as illustrated in FIG. 5F, objects A, B, and H have been copied to Old region 3 and Young regions 1 and 2, and Old region 5 have been reclaimed. Because Young object C and Old object G were not copied during garbage collection, as they were not reachable, Young object C and Old object G have been deallocated by reclaiming Young region 1 and Old region 5.

The present disclosure describes a garbage collection process that provides prompt reclamation of large objects. Because this garbage collection process reclaims large objects more promptly than conventional garbage collection processes that do not reclaim large objects until after a marking cycle has been triggered, more of the heap may be available at a given time to allocate to new objects. As a result, marking cycles may be triggered less frequently and the processing time required for more frequent marking cycles will not be expended. Further, because at most one object has to be examined to determine whether or not to reclaim a Humongous region, adding Humongous regions to regular garbage collection may not add significant garbage collection time to the garbage collection. Thus, a maximum amount of heap space may be reclaimed for a minimum amount of garbage collection time.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for garbage collection, comprising:
dividing a heap space for at least one program executing on at least one processing unit into a plurality of regions, the heap space stored in at least one memory, the plurality of regions including: a plurality of Young regions each operable to store at least one Young object, a plurality of Old regions each operable to store at least one Old object, and a plurality of Humongous regions each operable to store no more than one object;
maintaining a remembered set in the at least one memory for each region of the plurality of regions that specifies where there are references from outside the respective region to inside the respective region;
creating a garbage collection list in the at least one memory specifying regions of the plurality of regions to perform a garbage collection on, comprising:
including the plurality of Young regions in the garbage collection list;
selecting at least one Humongous region of the plurality of Humongous regions to include in the garbage collection list by:
selecting a fixed number of Humongous regions of the plurality of Humongous regions;
selecting at least one Humongous region of the plurality of Humongous regions that has fewest references specified in its remembered set until the fixed number of Humongous regions has been selected;
indicating in a selected Humongous region list Humongous regions of the plurality of Humongous regions that have previously been selected for inclusion in at least one previous garbage collection list;
selecting the fixed number of Humongous regions from Humongous regions of the plurality of Humongous regions that are not indicated in the selected Humongous region list;
updating the selected Humongous region list based on the selected fixed number of Humongous regions; and
if all Humongous regions of the plurality of Humongous regions are indicated in the selected Humongous region list, clearing the selected Humongous region list;
determining whether to select at least one Old region to include in the garbage collection list; and
when it is determined to select at least one Old region, selecting the at least one Old region and including the selected at least one Old region in the garbage collection list; and utilizing the at least one processing unit, performing the garbage collection on the regions specified in the garbage collection list by utilizing at least the remembered set for each respective region to determine if reachable objects are stored in the respective region; and performing a marking cycle, upon the occurrence of a triggering event by:
marking objects that are reachable; and
calculating a liveness percentage for each Old region of the plurality of Old regions based on the marked objects.

2. The method of claim 1, wherein said selecting at least one Humongous region of the plurality of Humongous regions comprises:
selecting all of the plurality of Humongous regions.

3. The method of claim 1, wherein said selecting at least one Humongous region of the plurality of Humongous regions comprises:
selecting each Humongous region of the plurality of Humongous regions that has less than a threshold number of references specified in the remembered set for that Humongous region.

4. The method of claim 1, wherein said selecting at least one Humongous region of the plurality of Humongous regions comprises:
selecting each Humongous region of the plurality of Humongous regions that stores at least a portion of an object that has a size above a threshold size.

5. The method of claim 1, wherein said selecting at least one Humongous region of the plurality of Humongous regions comprises:
selecting all Humongous regions of the plurality of Humongous regions that each contain only a portion of an object.

6. The method of claim 1, wherein said maintaining a remembered set in the at least one memory for each region of the plurality of regions that specifies where there are references from outside the respective region to inside the respective region comprises:
storing the remembered set for each region in that region.

7. The method of claim 1, wherein the indication for each region does not specify any references from objects in Young regions.

8. The method of claim 1, further comprising:
storing an object for the at least one program in at least one Humongous region of the plurality of Humongous regions if a size of the object is above a threshold size.

9. The method of claim 8, wherein an object is Young unless at least one of the size of the object is above the threshold size or the object has been copied to an Old region and the object is copied to the Old region after at least one of a threshold period of time has elapsed since the object was allocated or a threshold number of garbage collections have been performed since the object was allocated.

10. The method of claim 8, wherein said storing an object for the at least one program in at least one Humongous region of the plurality of Humongous regions if a size of the object is above a threshold size comprises:
storing the object in more than one Humongous region if the size of the object is larger than a size of one Humongous region.

11. The method of claim 1, wherein said dividing a heap space for at least one program executing on at least one processing unit into a plurality of regions comprises:
dividing the heap space into a plurality of equal-sized regions.

12. The method of claim 1, wherein performing the garbage collection of a region that is one selected from a Young region of the plurality of Young regions or an Old region of the plurality of Old regions comprises:
determining if any objects in the region are reachable;
if any objects in the region are reachable, copying the reachable objects to another region of the plurality of regions; and
reclaiming the region.

13. The method of claim 12, wherein performing the garbage collection of a region that a Humongous region of the plurality of Humongous regions comprises:
determining if there are any references to the region from outside the region;
if there are references to the region, marking the region as processed; and
if the region is not marked as processed, reclaiming the region.

14. The method of claim 1, further comprising:
creating a marking cycle list in the at least one memory, including at least one Old region of the Old regions, based on the liveness percentage for each Old region;
wherein said determining whether to select at least one Old region determines to select if the marking cycle list comprises at least one Old region and said selecting the at least one Old region comprises including the at least one Old region of the marking cycle list in the garbage collection list.

15. The method of claim 14, wherein said performing a marking cycle further comprises:
calculating a liveness indicator for each Humongous region of the plurality of Humongous regions based on marking information for the respective Humongous region; and
reclaiming at least one Humongous region of the plurality of Humongous regions if the respective liveness indicator indicates that the at least one Humongous region is not live.

16. A computing device comprising:
at least one processing unit; and
a computer program product stored in at least one computer readable medium and executable by the at least one processing unit, the computer program product comprising:
a first set of instructions to divide a heap space for at least one program executing on at least one processing unit into a plurality of regions, the heap space stored in at least one memory, the plurality of regions including: a plurality of Young regions each operable to store at least one Young object, a plurality of Old regions each operable to store at least one Old object, and a plurality of Humongous regions each operable to store no more than one object;
a second set of instructions to maintain a remembered set for each region of the plurality of regions that specifies where there are references from outside the respective region to inside the respective region;
a third set of instructions to create a garbage collection list specifying regions of the plurality of regions to perform a garbage collection on, comprising:
including the plurality of Young regions in the garbage collection list;
selecting at least one Humongous region of the plurality of Humongous regions to include in the garbage collection list by:
selecting a fixed number of Humongous regions of the plurality of Humongous regions;

selecting at least one Humongous region of the plurality of Humongous regions that has fewest references specified in its remembered set until the fixed number of Humongous regions has been selected;
indicating in a selected Humongous region list Humongous regions of the plurality of Humongous regions that have previously been selected for inclusion in at least one previous garbage collection list;
selecting the fixed number of Humongous regions from Humongous regions of the plurality of Humongous regions that are not indicated in the selected Humongous region list;
updating the selected Humongous region list based on the selected fixed number of Humongous regions; and
if all Humongous regions of the plurality of Humongous regions are indicated in the selected Humongous region list, clearing the selected Humongous region list;
determining whether to select at least one Old region to include in the garbage collection list; and
when it is determined to select at least one Old region, selecting the at least one Old region and including the selected at least one Old region in the garbage collection list;
a fourth set of instructions to perform the garbage collection on the regions specified in the garbage collection list utilizing at least the remembered set for each respective region to determine if reachable objects are stored in the respective region; and
a fifth set of instructions to perform a marking cycle, upon the occurrence of a triggering event by:
marking objects that are reachable; and
calculating a liveness percentage for each Old region of the plurality of Old regions based on the marked objects.

17. A computing device comprising:
at least one processing unit; and
a computer readable medium executable by the at least one processing unit, the computer readable medium comprising:
a first set of instructions to divide a heap space for at least one program executing on at least one processing unit into a plurality of regions, the heap space stored in at least one memory, the plurality of regions including: a plurality of Young regions each operable to store at least one Young object, a plurality of Old regions each operable to store at least one Old object, and a plurality of Humongous regions each operable to store no more than one object;
a second set of instructions to maintain a remembered set for each region of the plurality of regions that specifies where there are references from outside the respective region to inside the respective region;
a third set of instructions to create a garbage collection list specifying regions of the plurality of regions to perform a garbage collection on, comprising:
including the plurality of Young regions in the garbage collection list;
selecting at least one Humongous region of the plurality of Humongous regions and including the selected at least one Humongous region in the garbage collection list;
determining whether to select at least one Old region to include in the garbage collection list; and
when it is determined to select at least one Old region, selecting the at least one Old region and including the selected at least one Old region in the garbage collection list;
a fourth set of instructions to perform a garbage collection on the regions specified in the garbage collection list utilizing at least the remembered set for each respective region to determine if reachable objects are stored in the respective region; and
a fifth set of instructions to perform a marking cycle, upon the occurrence of a triggering event by:
marking objects that are reachable;
calculating a liveness percentage for each Old region of the plurality of Old regions based on the marked objects; and
creating a marking cycle list in the at least one memory, including at least one Old region of the Old regions, based on the liveness percentage for each Old region;
wherein said determining whether to select at least one Old region determines to select if the marking cycle list comprises at least one Old region and said selecting the at least one Old region comprises including the at least one Old region of the marking cycle list in the garbage collection list.

18. A computing device comprising:
at least one processing unit; and
a computer readable medium executable by the at least one processing unit, the computer readable medium comprising:
a first set of instructions to divide a heap space for at least one program executing on at least one processing unit into a plurality of regions, the heap space stored in at least one memory, the plurality of regions including: a plurality of Young regions each operable to store at least one Young object, a plurality of Old regions each operable to store at least one Old object, and a plurality of Humongous regions each operable to store no more than one object;
a second set of instructions to maintain a remembered set for each region of the plurality of regions that specifies where there are references from outside the respective region to inside the respective region;
a third set of instructions to create a garbage collection list specifying regions of the plurality of regions to perform a garbage collection on, comprising:
including the plurality of Young regions in the garbage collection list;
selecting at least one Humongous region of the plurality of Humongous regions and including the selected at least one Humongous region in the garbage collection list;
determining whether to select at least one Old region to include in the garbage collection list; and
when it is determined to select at least one Old region, selecting the at least one Old region and including the selected at least one Old region in the garbage collection list;
a fourth set of instructions to perform the garbage collection on the regions specified in the garbage collection list utilizing at least the remembered set for each respective region to determine if reachable objects are stored in the respective region; and
a fifth set of instructions to perform a marking cycle, upon the occurrence of a triggering event by:
marking objects that are reachable;

calculating a liveness percentage for each Old region of the plurality of Old regions based on the marked objects;

creating a marking cycle list in the at least one memory, including at least one Old region of the Old regions, based on the liveness percentage for each Old region;

wherein said determining whether to select at least one Old region determines to select if the marking cycle list comprises at least one Old region and said selecting the at least one Old region comprises including the at least one Old region of the marking cycle list in the garbage collection list;

calculating a liveness indicator for each Humongous region of the plurality of Humongous regions based on marking information for the respective Humongous region; and reclaiming at least one Humongous region of the plurality of Humongous regions if the respective liveness indicator indicates that the at least one Humongous region is not live.

\* \* \* \* \*